(12) United States Patent
Saunders et al.

(10) Patent No.: US 10,953,926 B2
(45) Date of Patent: Mar. 23, 2021

(54) PROTECTIVE CAGE ASSEMBLIES FOR ELECTRIFIED VEHICLE BATTERY PACKS

(71) Applicant: FORD GLOBAL TECHNOLOGIES, LLC, Dearborn, MI (US)

(72) Inventors: Robert Howard Saunders, Oak Park, MI (US); Wayne Haider, Dearborn, MI (US); Catherine Bansek, Royal Oak, MI (US); Steven Michael Cyr, Lake Orion, MI (US); Luke Allen Pontz, Royal Oak, MI (US); Sahil Nagpal, Dearborn Heights, MI (US); Jeffery Gilchrist, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 156 days.

(21) Appl. No.: 15/918,193

(22) Filed: Mar. 12, 2018

(65) Prior Publication Data

US 2019/0276083 A1  Sep. 12, 2019

(51) Int. Cl.
*B60K 1/04* (2019.01)
*B62D 21/15* (2006.01)
*B60L 50/64* (2019.01)

(52) U.S. Cl.
CPC .............. *B62D 21/155* (2013.01); *B60K 1/04* (2013.01); *B60L 50/64* (2019.02); *B60K 2001/0416* (2013.01); *B60K 2001/0438* (2013.01); *B60Y 2306/01* (2013.01)

(58) Field of Classification Search
CPC .... B60K 2001/0438; B60K 2001/0433; B60L 50/66
USPC ....................................................... 180/68.5
See application file for complete search history.

(56) References Cited

U.S. PATENT DOCUMENTS

| | | | | |
|---|---|---|---|---|
| 5,501,289 A * | 3/1996 | Nishikawa | ............... | B60K 1/04 180/68.5 |
| 7,610,978 B2 * | 11/2009 | Takasaki | .................. | B60K 1/04 180/68.5 |
| 7,824,797 B2 * | 11/2010 | Nishino | .................... | B60K 1/04 429/154 |
| 8,286,743 B2 | 10/2012 | Rawlinson | | |
| 8,511,412 B2 * | 8/2013 | Kawaguchi | ......... | H01M 2/1083 180/68.5 |
| 8,540,282 B2 * | 9/2013 | Yoda | ........................ | B60K 1/04 280/784 |
| 8,585,128 B2 * | 11/2013 | Hoshino | .................. | B60K 1/04 296/187.05 |
| 8,672,354 B2 * | 3/2014 | Kim | ......................... | B60K 1/04 280/783 |

(Continued)

FOREIGN PATENT DOCUMENTS

CN   103832257 B   6/2017

*Primary Examiner* — Jeffrey J Restifo
(74) *Attorney, Agent, or Firm* — David B. Kelley; Carlson, Gaskey & Olds

(57) ABSTRACT

A protective cage assembly includes a frame, a bracket assembly mounted to a first tubular member of the frame, a gusset of the bracket assembly extending between the bracket assembly and a second tubular member of the frame, and a third tubular member of the frame removably received by the bracket assembly. The protective cage assembly may be mounted within a cargo space of an electrified vehicle for both protecting the battery pack and establishing a load bearing floor of the cargo space.

21 Claims, 7 Drawing Sheets

(56) References Cited

U.S. PATENT DOCUMENTS

| | | | | |
|---|---|---|---|---|
| 8,714,616 B2* | 5/2014 | Minami | ................ | B60K 1/04 |
| | | | | 296/37.16 |
| 8,813,888 B2* | 8/2014 | Ogawa | ................ | B62D 25/082 |
| | | | | 180/180 |
| 8,863,878 B2* | 10/2014 | Shirooka | ................ | B60K 1/04 |
| | | | | 180/68.5 |
| 8,936,125 B2* | 1/2015 | Nakamori | ................ | B60K 1/04 |
| | | | | 180/68.5 |
| 8,955,632 B2* | 2/2015 | Schurna | ................ | B62D 23/005 |
| | | | | 180/210 |
| 9,033,084 B2* | 5/2015 | Joye | ................ | B60K 1/04 |
| | | | | 180/68.5 |
| 9,061,712 B2* | 6/2015 | Patberg | ................ | B62D 21/157 |
| 9,162,558 B2* | 10/2015 | Stenberg | ................ | B60K 1/04 |
| 9,236,592 B2* | 1/2016 | Sundararajan | ................ | H01M 2/1077 |
| 9,242,540 B2* | 1/2016 | Shirooka | ................ | B60K 1/04 |
| 9,463,828 B2* | 10/2016 | Le Jaouen | ................ | B60K 1/04 |
| 9,487,237 B1* | 11/2016 | Vollmer | ................ | B62D 21/152 |
| 9,630,502 B2* | 4/2017 | Chen | ................ | B60L 1/003 |
| 9,643,660 B2* | 5/2017 | Vollmer | ................ | B62D 25/2072 |
| 9,929,389 B2* | 3/2018 | Klimek | ................ | H01M 2/1077 |
| 9,956,861 B2* | 5/2018 | Nomura | ................ | B60K 1/04 |
| 10,131,381 B2* | 11/2018 | Ashraf | ................ | B60K 1/04 |
| 10,220,694 B2* | 3/2019 | Mizoguchi | ................ | B60K 1/04 |
| 10,300,948 B2* | 5/2019 | Ashraf | ................ | B62D 21/03 |
| 10,370,035 B2* | 8/2019 | Fees | ................ | B60K 1/04 |
| 10,377,216 B2* | 8/2019 | Hitz | ................ | H01M 2/1077 |
| 10,381,618 B2* | 8/2019 | Fees | ................ | H01M 2/1077 |
| 10,384,720 B2* | 8/2019 | Tsukada | ................ | B62D 21/155 |
| 10,391,881 B2* | 8/2019 | Kim | ................ | B60K 1/04 |
| 2004/0079569 A1* | 4/2004 | Awakawa | ................ | B60K 1/04 |
| | | | | 180/68.5 |
| 2010/0314184 A1* | 12/2010 | Stenberg | ................ | B60K 1/04 |
| | | | | 180/65.6 |
| 2011/0297469 A1* | 12/2011 | Usami | ................ | B60K 1/04 |
| | | | | 180/68.5 |
| 2012/0125704 A1* | 5/2012 | Kawaguchi | ................ | B60K 1/04 |
| | | | | 180/68.5 |
| 2012/0175177 A1* | 7/2012 | Lee | ................ | B60K 1/04 |
| | | | | 180/68.5 |
| 2013/0088045 A1 | 4/2013 | Charbonneau et al. | | |
| 2015/0135940 A1 | 5/2015 | Rawlinson | | |
| 2016/0159221 A1* | 6/2016 | Chen | ................ | B60K 17/165 |
| | | | | 180/53.8 |

\* cited by examiner

PROTECTIVE CAGE ASSEMBLIES FOR ELECTRIFIED VEHICLE BATTERY PACKS

TECHNICAL FIELD

This disclosure relates to cage assemblies for protecting electrified vehicle battery packs during impact events.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage traction battery pack typically powers the electric machines and other electrical loads of the electrified vehicle. The battery pack includes a plurality of energy storage devices, such as battery cells, that store energy for powering these electrical loads. The battery cells and various other battery components are typically packaged together inside an enclosure assembly. Depending on where it is mounted on the vehicle, the battery pack may be susceptible to damage during vehicle impact events.

SUMMARY

A protective cage assembly according to an exemplary aspect of the present disclosure includes, among other things, a frame, a bracket assembly mounted to a first tubular member of the frame, a gusset of the bracket assembly extending between the bracket assembly and a second tubular member of the frame, and a third tubular member of the frame removably received by the bracket assembly.

In a further non-limiting embodiment of the foregoing assembly, the first tubular member is a longitudinally extending tubular member, the second tubular member is a vertically extending tubular member, and the third tubular member is a laterally extending tubular member.

In a further non-limiting embodiment of either of the foregoing assemblies, the frame includes a plurality of tubular members that are connected together to form a rectangular shape.

In a further non-limiting embodiment of any of the foregoing assemblies, a load bearing floor is secured to the third tubular member.

In a further non-limiting embodiment of any of the foregoing assemblies, the frame includes a lower frame portion, an upper frame portion, and an intermediate frame portion.

In a further non-limiting embodiment of any of the foregoing assemblies, a first floor panel of a load bearing floor is secured to the upper frame portion, and a second floor panel of the load bearing floor is secured to the intermediate frame portion.

In a further non-limiting embodiment of any of the foregoing assemblies, the upper frame portion and the intermediate frame portion establish a stepped upper section of the frame.

In a further non-limiting embodiment of any of the foregoing assemblies, the upper frame portion extends a first height above the lower frame portion and the intermediate frame portion extends a second, shorter height above the lower frame portion.

In a further non-limiting embodiment of any of the foregoing assemblies, the bracket assembly includes a U-shaped bracket, and the third tubular member is slidingly received within the U-shaped bracket.

In a further non-limiting embodiment of any of the foregoing assemblies, the gusset extends from the U-shaped bracket to the second tubular member.

An electrified vehicle according to another exemplary aspect of the present disclosure includes, among other things, a drive wheel, a cargo space, a battery pack positioned within the cargo space and adapted to selectively supply power for propelling the drive wheel, and a protective cage assembly configured to protect the battery pack and establish a load bearing floor of the cargo space.

In a further non-limiting embodiment of the foregoing electrified vehicle, the electrified vehicle is a van.

In a further non-limiting embodiment of either of the foregoing electrified vehicles, the battery pack is mounted to an upper surface of a floor pan of the electrified vehicle.

In a further non-limiting embodiment of any of the foregoing electrified vehicles, the battery pack houses at least one battery array.

In a further non-limiting embodiment of any of the foregoing electrified vehicles, the protective cage assembly surrounds and partially encloses the battery pack.

In a further non-limiting embodiment of any of the foregoing electrified vehicles, the protective cage assembly includes a frame constructed of a plurality of longitudinally extending tubular members, a plurality of laterally extending tubular members, and a plurality of vertically extending tubular members.

In a further non-limiting embodiment of any of the foregoing electrified vehicles, at least one of the plurality of laterally extending tubular members is removable from the frame.

In a further non-limiting embodiment of any of the foregoing electrified vehicles, the protective cage assembly includes a lower frame portion, an upper frame portion, and an intermediate frame portion.

In a further non-limiting embodiment of any of the foregoing electrified vehicles, the load bearing floor includes a first floor panel secured to the upper frame portion and a second floor panel secured to the intermediate frame portion.

In a further non-limiting embodiment of any of the foregoing electrified vehicles, the upper frame portion extends to a first height that is equal to a second height of a folded seat located within a passenger cabin that is connected to the cargo space.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details electrified vehicles that are equipped with protective cage assembles for protecting battery packs during vehicle impact events. An exemplary protective cage assembly includes a frame and a bracket assembly secured to the frame. A tubular member of the frame may be removably received by the bracket assembly. The protective cage assembly may be mounted within a cargo space of an electrified vehicle for both protecting the battery pack and establishing a load bearing floor of the cargo space. These and other features are discussed in greater detail in the following paragraphs of this detailed description.

Figure 1:
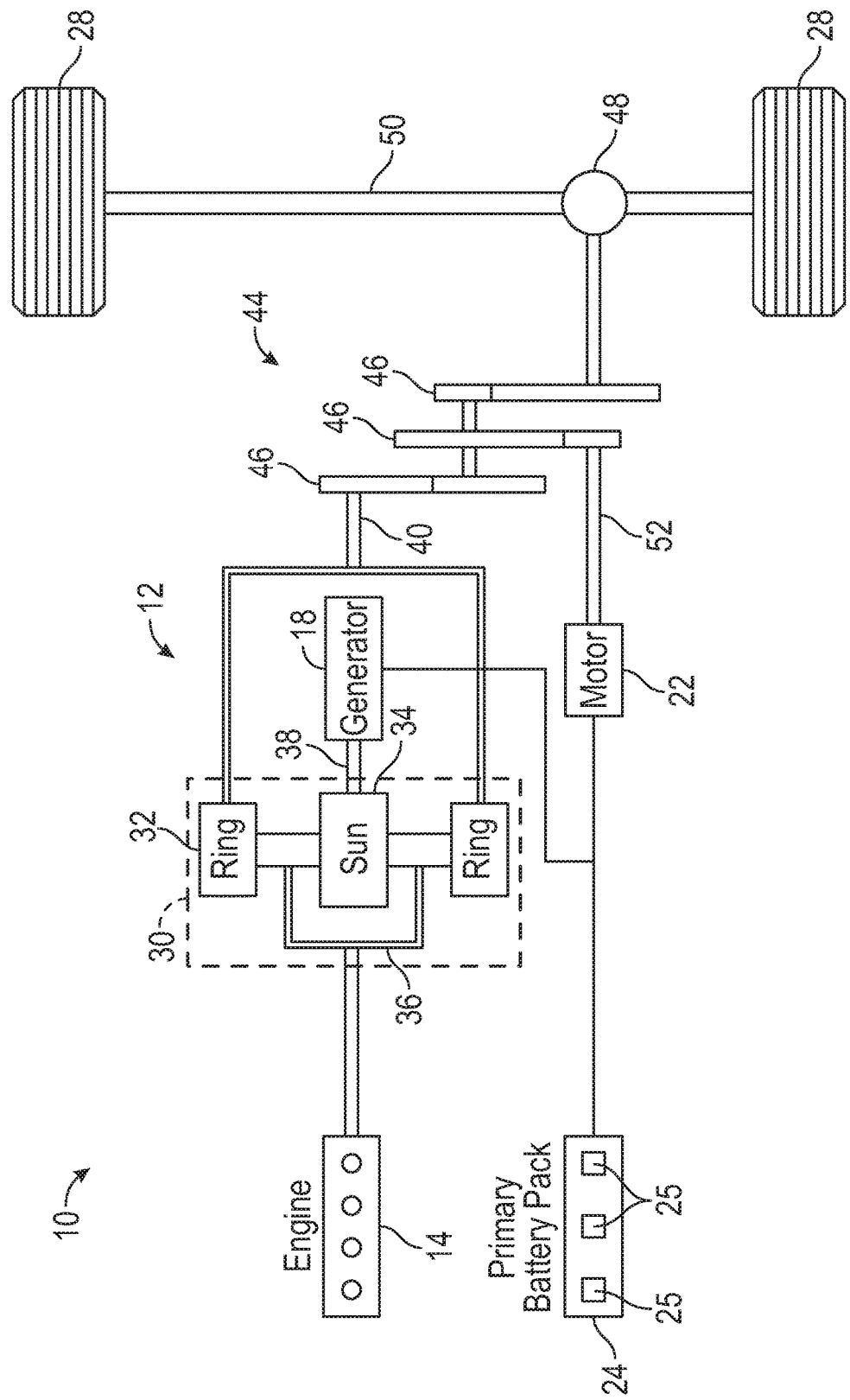
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEV's), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery that includes a plurality of battery arrays 25 (i.e., battery assemblies or groupings of battery cells) capable of outputting electrical power to operate the motor 22, the generator 18, and/or other electrical loads of the electrified vehicle 12 for providing power to propel the wheels 28. Other types of energy storage devices and/or output devices could also be used to electrically power the electrified vehicle 12.

In an embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
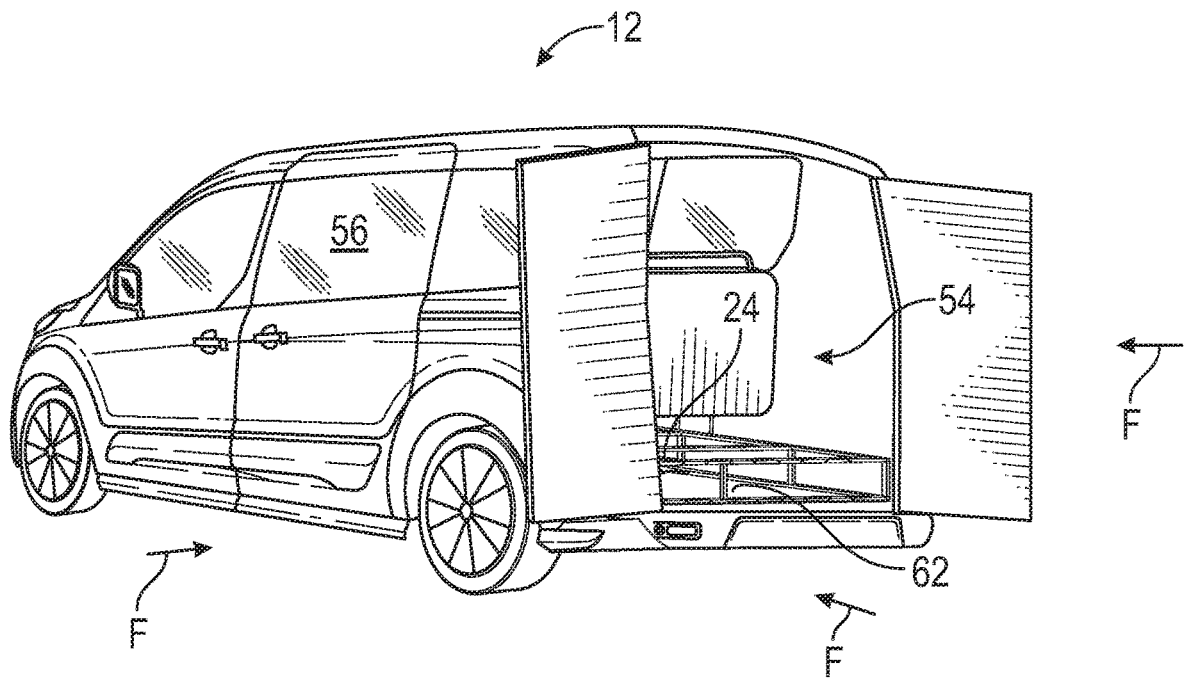
FIG. 2 illustrates an electrified vehicle that may employ the powertrain of FIG. 1.

FIG. 2 illustrates an electrified vehicle 12 that may employ the powertrain 10 shown in FIG. 1 or any other electrified or hybridized powertrain. In an embodiment, the electrified vehicle 12 is a van. However, the electrified vehicle 12 could be a car, a truck, a sport utility vehicle, or any other vehicle type. Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component.

The electrified vehicle 12 includes a cargo space 54 for storing and hauling cargo at a rear location of the electrified vehicle 12. The cargo space 54 is located in a rear portion of the passenger cabin 56 of the electrified vehicle 12, in this embodiment.

Figure 3:
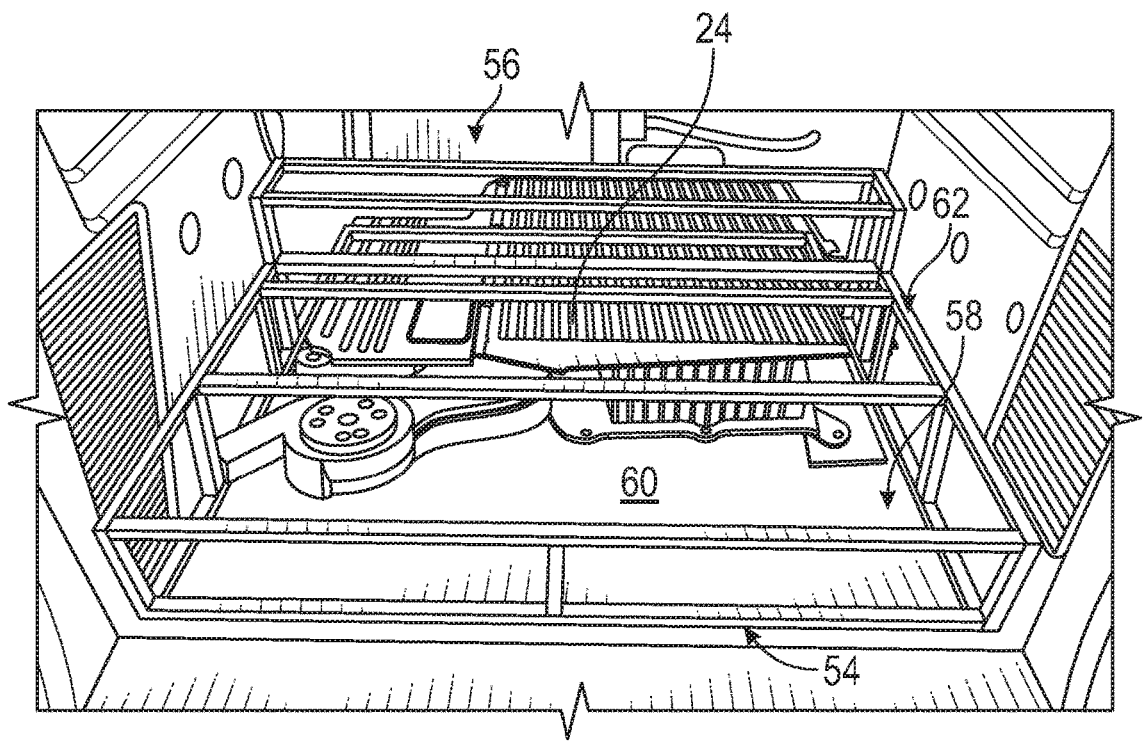
FIG. 3 is an enlarged view of a cargo space of the electrified vehicle of FIG. 2. A battery pack and a protective cage assembly are mounted within the cargo space.

Referring now to FIGS. 2 and 3, a battery pack 24 may be mounted to a floor pan 58 that extends within the cargo space 54. The floor pan 58 is part of the structural body of the electrified vehicle 12. In an embodiment, the battery pack 24 is mounted to an upper surface 60 of the floor pan 58. The battery pack 24 may be secured to the floor pan 58 using any fastening method, including but not limited to bolting, strapping, welding, etc.

The battery pack 24 may house a plurality of battery cells that store energy for powering various electrical loads of the electrified vehicle 12, such as the motor 22 (see FIG. 1), for example. The battery cells may be grouped together in one or more battery arrays (shown schematically in FIG. 1 as feature 25). In an embodiment, the battery pack 24 houses prismatic, lithium-ion cells. However, battery cells having other geometries (cylindrical, pouch, etc.), other chemistries (nickel-metal hydride, lead-acid, etc.), or both could alternatively be utilized within the scope of this disclosure. The battery pack 24 may additionally house various other components, including but not limited to, a bussed electrical center (BEC), a battery electric control module (BECM), wiring harnesses, wiring, I/O connectors, etc.

A protective cage assembly 62 may additionally be mounted to the upper surface 60 of the floor pan 58. The protective cage assembly 62 is positioned to surround and partially enclose the battery pack 24, thereby protecting the battery pack 24 from deformation during impact events, such as vehicle collisions. For example, during a vehicle impact event (e.g., front, side, rear, side pole, etc.), one or more forces F may act upon the electrified vehicle 12. The protective cage assembly 62 is designed to minimize the amount of energy that is transferred to the battery pack 24 during the vehicle impact event.

Figure 4:
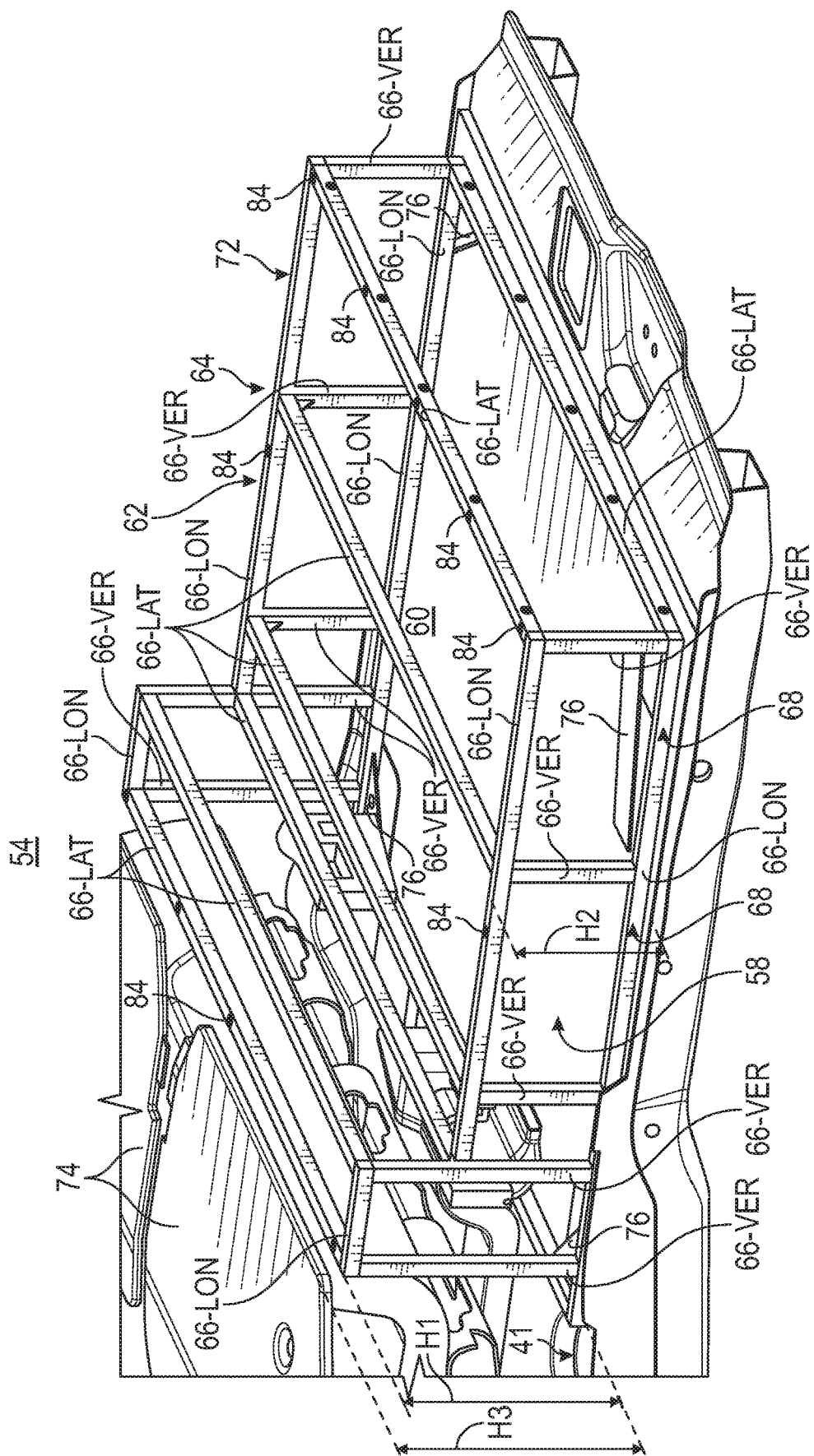
FIG. 4 illustrates an exemplary protective cage assembly for protecting a battery pack during impact events.
Figure 5:
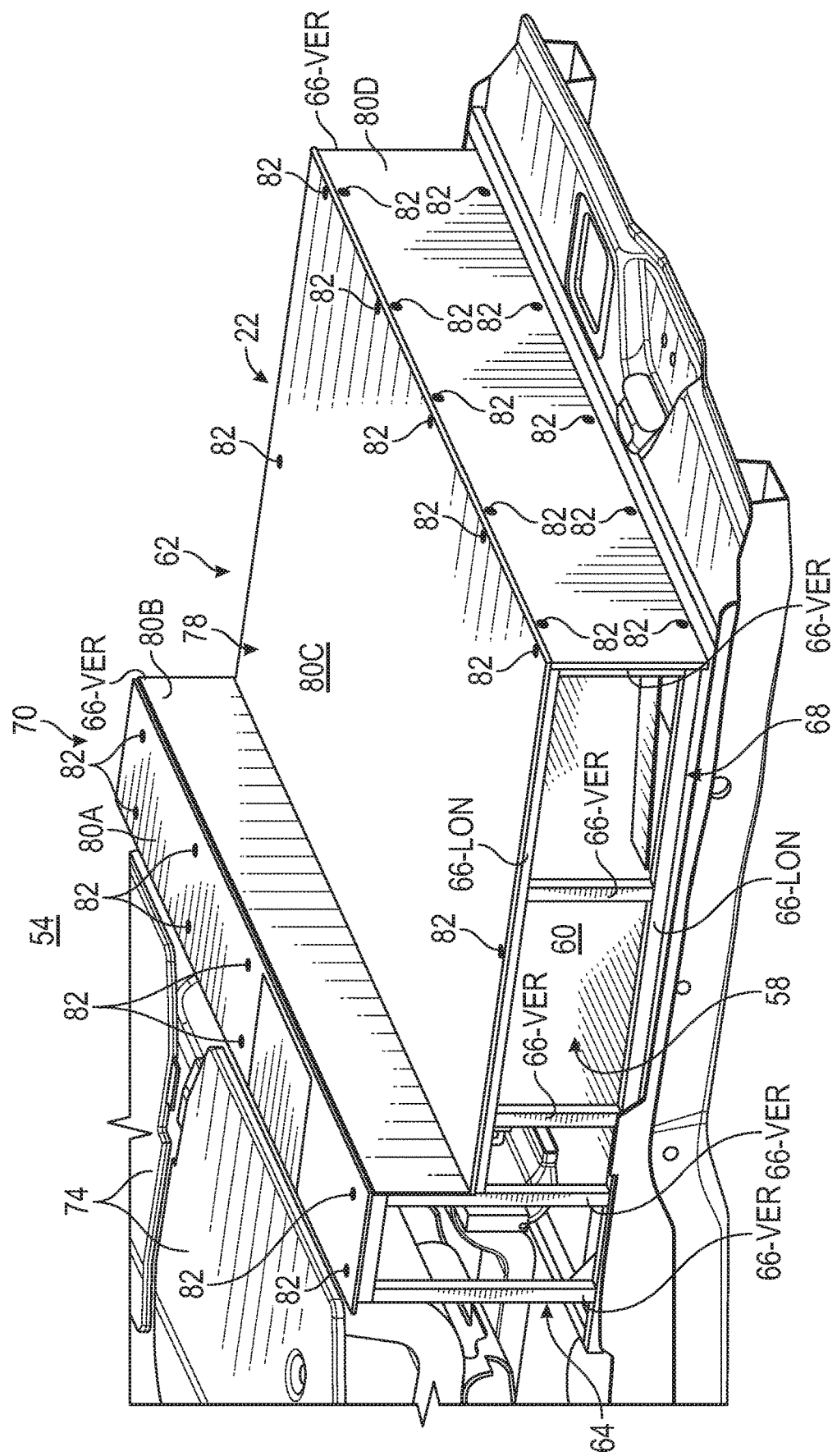
FIG. 5 illustrates a load bearing floor of the protective cage assembly of FIG. 4.

FIGS. 4 and 5 illustrate additional features of the exemplary protective cage assembly 62. The battery pack 24 is removed from these figures to better illustrate the various features of the protective cage assembly 62.

The protective cage assembly 62 may include a frame 64 that is made up of a plurality of tubular members 66. The plurality of tubular members 66 may be arranged longitudinally (see, e.g., tubular members 66-LON), laterally (see, e.g., tubular members 66-LAT), and vertically (see, e.g., tubular members 66-VER) relative to the floor pan 58 and may be connected together to establish the frame 64. In an embodiment, the plurality of tubular members 66 are welded together. In another embodiment, the plurality of tubular members 66 are fixated together using mechanical fasteners.

The frame 64 may be generally rectangular in shape, and each of the tubular members 66 may be constructed of a metallic material or a combination of metallic materials. However, the actual size, shape, and material makeup of the frame 64 are not intended to limit this disclosure.

The frame 64 may include a lower frame portion 68, an upper frame portion 70, and an intermediate frame portion 72. Two or more of the vertically extending tubular members 66-VER extend between the lower frame portion 68 and each of the upper frame portion 70 and the intermediate frame portion 72. In an embodiment, the upper frame portion 70 is positioned at a first height H1 above the lower frame portion 68 and the intermediate frame portion 72 is positioned at a second, shorter height H2 above the lower frame portion 68. The upper frame portion 70 and the intermediate frame portion 72 therefore establish a stepped upper section of the frame 64.

In another embodiment, the height H1 of the upper frame portion 70 is about equal to a height H3 of a folded position of a passenger seat (or seats) 74 of the electrified vehicle 12. In this way, the folded passenger seat(s) 74 and the upper frame portion 70 of the frame 64 cooperate to provide a level surface for storing cargo within the cargo space 54.

The lower frame portion 68 establishes a base of the protective cage assembly 62 and may include two or more longitudinally extending tubular members 66-LON and two or more laterally extending tubular members 66-LAT. The lower frame portion 68 may additionally include one or more mounting brackets 76 for securing the frame 64 to the floor pan 58. In an embodiment, one mounting bracket 76 is provided at each corner of the lower frame portion 68.

The upper frame portion 70 and the intermediate frame portion may also each include two or more longitudinally extending tubular members 66-LON and two or more laterally extending tubular members 66-LAT. The total number of tubular members 66-LON, 66-LAT, and 66-VER utilized to construct the frame 64 may vary and is dependent on the size of the cargo space 54 and the size of the battery pack 24, among other design criteria.

Referring now primarily to FIG. 5, the protective cage assembly 62 may additionally include a load bearing floor 78 that is securable to the frame 64. In an embodiment, the load bearing floor 78 includes a plurality of floor panels 80 that may be secured to portions of the frame 64 for storing cargo at a location above the battery pack 24. The floor panels 80 may be made of plywood or any other material that is of sufficient strength to support cargo on top of the protective cage assembly 62.

In an embodiment, the load bearing floor 78 includes a first floor panel 80A secured to the upper frame portion 70, a second floor panel 80B secured to the vertically extending tubular members 66-VER that extend between the lower frame portion 68 and the upper frame portion 70 on the side of the upper frame portion 70 that is adjacent to the intermediate frame portion 72, a third floor panel 80C secured to the intermediate frame portion 72, and a fourth floor panel 80D secured to the vertically extending tubular members 66-VER that extend between the lower frame portion 68 and the intermediate frame portion 72 at a rearmost location of the frame 64. Other configuration are contemplated within the scope of this disclosure.

The floor panels 80 may be secured to the various tubular members 66 of the frame 64 using one or more fasteners 82, such as threaded fasteners. In an embodiment, at least a portion of the tubular members 66 include imbedded receiving nuts 84 (see FIG. 4) for receiving the fasteners 82.

Figure 6A:
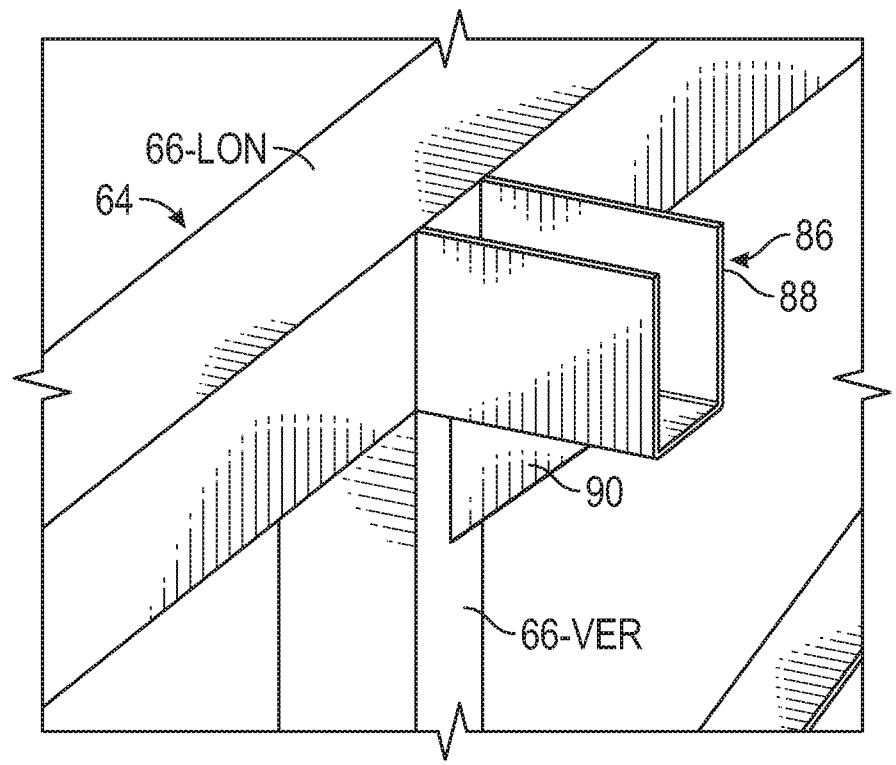
FIGS. 6A and 6B illustrate a bracket assembly of the protective cage assembly of FIGS. 4 and 5.
Figure 6B:
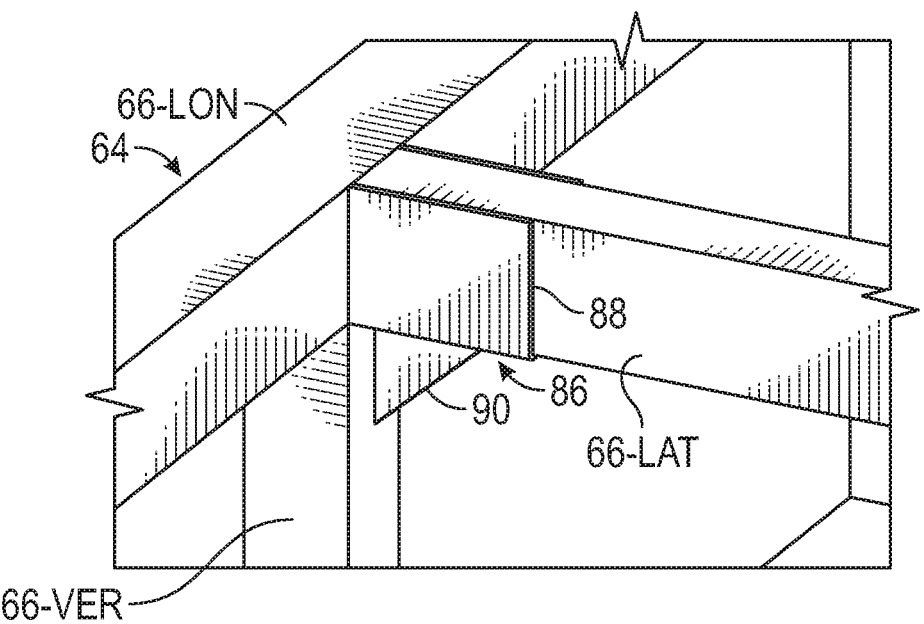

It may be desirable to remove portions of the frame 64 of the protective cage assembly 62 in order to repair or replace the battery pack 24. To achieve this objective, one or more of the tubular members 66 may be selectively removed from the frame 64. For example, as shown in FIGS. 6A and 6B, one or more of the laterally extending tubular members 66-LAT may be removably secured to the frame 64 using bracket assemblies 86. Each bracket assembly 86 may include a U-shaped bracket 88 and a gusset 90. In an embodiment, the U-shaped bracket 88 may be secured to a longitudinally extending tubular member 66-LON, and the gusset 90, which may be a triangular shaped reinforcement, may extend between the U-shaped bracket 88 and a vertically extending tubular member 66-VER. A laterally extending tubular member 66-LAT (see FIG. 6B) may be slid downwardly into the U-shaped bracket 88 when assembling the upper frame portion 68 and the intermediate frame portion 72 of the frame 64. The tubular member 66-LAT can easily be removed by sliding the laterally extending tubular member 66-LAT upwardly out of the U-shaped bracket 88.

Figure 7:
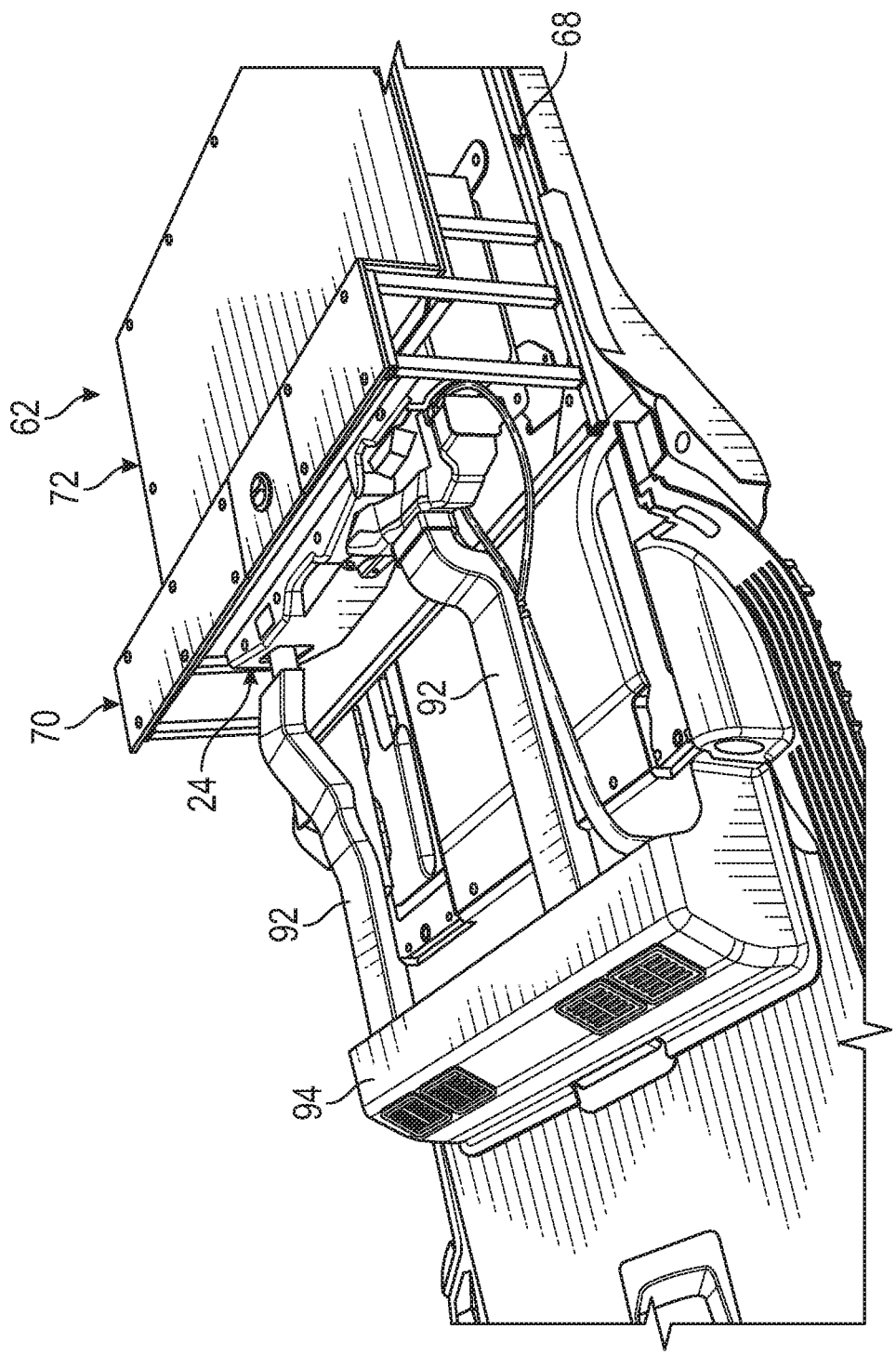
FIG. 7 is a front, perspective view of the cargo space, the battery pack, and the protective cage assembly of FIG. 3.
Figure 8:
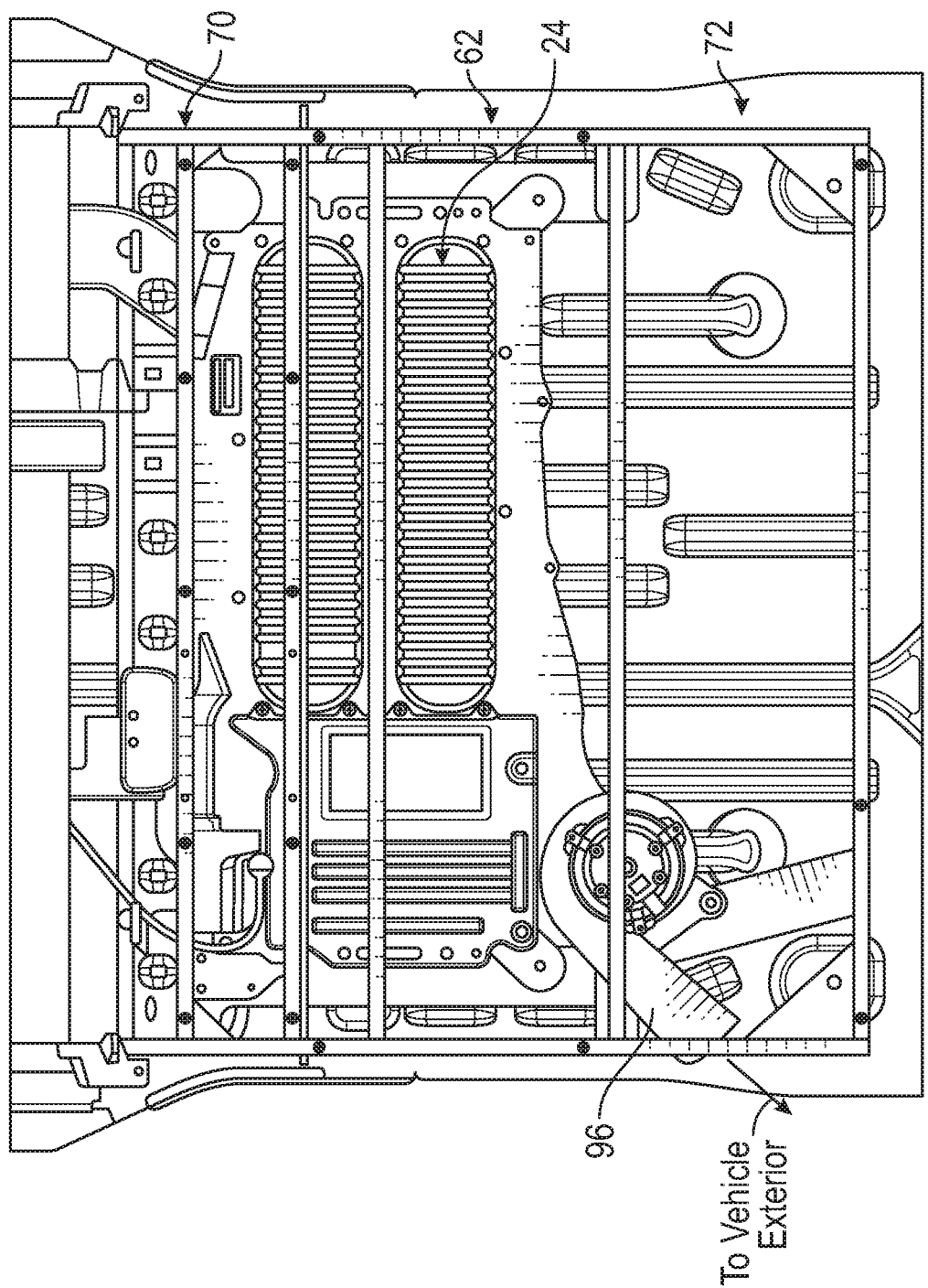
FIG. 8 is a top view of the cargo space, the battery pack, and the protective battery cage of FIG. 3.

Referring now to FIGS. 7 and 8, the protective cage assembly 62 may additionally protect portions of a thermal management system associated with the battery pack 24. For example, the upper frame portion 70 may cover portions of inlet ducting 92 that extends between a vent panel 94 and the front of the protective cage assembly 62 (see, e.g., FIG. 7), and the intermediate frame portion 70 may cover portions of an outlet duct 96 that extends through a side of the frame 64 near the rear of the protective cage assembly 62 (see, e.g., FIG. 8). In the illustrated embodiment, air circulating within the passenger cabin 56 may enter the inlet ducting 92 through the vent panel 94, pass through the battery pack 24 for removing heat from the battery pack 24, and then be expelled to the vehicle exterior through the outlet duct 96.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A protective cage assembly, comprising:
   a frame including a lower frame portion, an upper frame portion, and an intermediate frame portion;
   a bracket assembly mounted to a first tubular member of the frame;
   a gusset of the bracket assembly extending between the bracket assembly and a second tubular member of the frame; and
   a third tubular member of the frame removably received by the bracket assembly,
   wherein the intermediate frame portion covers portions of an outlet duct of a battery thermal management system.

2. The assembly as recited as recited in claim 1, wherein the first tubular member is a longitudinally extending tubular member, the second tubular member is a vertically extending tubular member, and the third tubular member is a laterally extending tubular member.

3. The assembly as recited in claim 1, wherein the frame includes a plurality of tubular members that are connected together to form a rectangular shape.

4. The assembly as recited in claim 1, comprising a load bearing floor secured to the third tubular member.

5. The assembly as recited in claim 1, comprising a first floor panel of a load bearing floor secured to the upper frame portion and a second floor panel secured to the intermediate frame portion.

6. The assembly as recited in claim 5, wherein the upper frame portion and the intermediate frame portion establish a stepped upper section of the frame.

7. The assembly as recited in claim 5, wherein the upper frame portion extends a first height above the lower frame portion, and further wherein the intermediate frame portion extends a second, shorter height above the lower frame portion.

8. The assembly as recited in claim 1, wherein the bracket assembly includes a U-shaped bracket, and the third tubular member is slidingly received within the U-shaped bracket.

9. The assembly as recited in claim 8, wherein the gusset extends from the U-shaped bracket to the second tubular member.

10. An electrified vehicle, comprising:
    a drive wheel;
    a cargo space;
    a battery pack positioned within the cargo space and adapted to selectively supply power for propelling the drive wheel; and
    a protective cage assembly configured to protect the battery pack and establish a load bearing floor of the cargo space,
    wherein the protective cage assembly includes a lower frame portion, an upper frame portion, and an intermediate frame portion,
    wherein the upper frame portion covers portions of an inlet duct of a battery thermal management system,
    wherein the inlet duct extends between a vent panel and a front portion of the protective cage assembly.

11. The electrified vehicle as recited in claim 10, wherein the electrified vehicle is a van.

12. The electrified vehicle as recited in claim 10, wherein the battery pack is mounted to an upper surface of a floor pan of the electrified vehicle.

13. The electrified vehicle as recited in claim 10, wherein the battery pack houses at least one battery array.

14. The electrified vehicle as recited in claim 10, wherein the protective cage assembly surrounds and partially encloses the battery pack.

15. The electrified vehicle as recited in claim 10, wherein the protective cage assembly includes a frame constructed of a plurality of longitudinally extending tubular members, a plurality of laterally extending tubular members, and a plurality of vertically extending tubular members.

16. The electrified vehicle as recited in claim 15, wherein at least one of the plurality of laterally extending tubular members are removable from the frame.

17. The electrified vehicle as recited in claim 10, wherein the load bearing floor includes a first floor panel secured to the upper frame portion and a second floor panel secured to the intermediate frame portion.

18. The electrified vehicle as recited in claim 10, wherein the upper frame portion extends to a first height that is equal to a second height of a folded seat located within a passenger cabin that is connected to the cargo space.

19. The electrified vehicle as recited in claim 10, wherein the intermediate frame portion covers portions of an outlet duct of a battery thermal management system.

20. The electrified vehicle as recited in claim 10, wherein a frame of the protective cage assembly is made of metal and the load bearing floor is made of plywood.

21. An electrified vehicle, comprising:
- a battery pack; and
- a protective cage assembly at least partially surrounding the battery pack, wherein the protective cage assembly includes:
  - a longitudinally extending metallic tubular member;
  - a bracket assembly secured to the longitudinally extending metallic tubular member,
  - wherein the bracket assembly includes a U-shaped bracket and a gusset;
  - a vertically extending metallic tubular member,
  - wherein the gusset is triangular shaped and extends from the U-shaped bracket to the vertically extending metallic tubular member;
  - a laterally extending metallic tubular member movably received within the U-shaped bracket; and
  - a wooden load bearing floor secured to the laterally extending metallic tubular member,
- wherein the protective cage assembly covers portions of an inlet duct or an outlet duct of a battery thermal management system associated with the battery pack.

* * * * *